US006757952B1

(12) United States Patent
Stager

(10) Patent No.: US 6,757,952 B1
(45) Date of Patent: Jul. 6, 2004

(54) RING SLICER WITH EASILY REMOVABLE KNIFE AND KNIFE ASSEMBLY

(75) Inventor: Bradley R. Stager, Beaverton, OR (US)

(73) Assignee: Key Knife, Inc., Tualatin, OR (US)

( * ) Notice: Subject to any disclaimer, the term of this patent is extended or adjusted under 35 U.S.C. 154(b) by 0 days.

(21) Appl. No.: 10/280,278

(22) Filed: Oct. 25, 2002

(51) Int. Cl.[7] ............................ B23P 6/00; B23P 19/04; B27C 1/00

(52) U.S. Cl. ................................ 29/402.03; 29/402.04; 29/402.09; 29/426.1; 29/426.5; 144/174; 241/93; 241/294

(58) Field of Search ......................... 29/402.03, 402.04, 29/402.05, 402.09, 426.1, 426.5, 426.6; 144/172, 174, 162.1, 163, 241, 176, 209.1; 241/85, 86, 92, 93, 95, 294

(56) References Cited

U.S. PATENT DOCUMENTS

| | | | | | |
|---|---|---|---|---|---|
| 3,865,164 | A | * | 2/1975 | Sybertz | 144/230 |
| 3,989,077 | A | * | 11/1976 | Humbert | 144/230 |
| 4,135,563 | A | * | 1/1979 | Maucher | 144/373 |
| 4,139,034 | A | * | 2/1979 | Chapman | 144/172 |
| 4,194,545 | A | * | 3/1980 | Kostermeier | 144/230 |
| 4,972,888 | A | * | 11/1990 | Dean | 144/172 |
| 5,271,440 | A | * | 12/1993 | Bradstreet et al. | 144/176 |
| 5,271,442 | A | * | 12/1993 | Carpenter et al. | 144/220 |
| 5,313,696 | A | * | 5/1994 | Dunne et al. | 29/426.1 |
| 5,348,064 | A | * | 9/1994 | Nettles et al. | 144/176 |
| 5,444,904 | A | * | 8/1995 | Kokko | 29/402.8 |
| 5,456,300 | A | * | 10/1995 | Rosenkranz et al. | 144/230 |
| 5,485,873 | A | * | 1/1996 | Crammond | 144/162.1 |
| 5,725,464 | A | * | 3/1998 | Pallmann | 483/1 |
| 5,819,826 | A | * | 10/1998 | Schmatjen | 144/241 |
| 5,937,923 | A | | 8/1999 | Bielagus et al. | |
| 5,979,522 | A | * | 11/1999 | Swartwood et al. | 144/176 |
| 5,996,655 | A | * | 12/1999 | Cramond et al. | 144/176 |
| 6,554,032 | B2 | * | 4/2003 | Pallmann | 144/172 |
| 6,561,885 | B1 | * | 5/2003 | Loth | 451/122 |
| 6,591,878 | B2 | * | 7/2003 | Hinchliff | 144/241 |

* cited by examiner

*Primary Examiner*—Essama Omgba
(74) *Attorney, Agent, or Firm*—Birdwell & Janke, LLP

(57) ABSTRACT

A ring slicer having an easily removable knife and knife assembly. Within the scope of the invention, there is an apparatus for cutting an article of wood, comprising a ring assembly comprising two end plates and a plurality of knife assemblies. Each knife assembly comprises a knife, a base, and a clamp for clamping the knife to the base. The assemblies are provided for installation between the end plates. According to one aspect of the invention, the bases include one or more first apertures and at least one of the end plates includes a corresponding set of one or more second apertures therethrough for receiving respective dowel pins. The first apertures are adapted to snugly slidingly receive the respective dowel pins. According to another aspect of the invention, for each knife assembly, the clamp includes an upper clamping member that is mounted to the base so that a portion of the upper clamping member is cantilevered from the base.

16 Claims, 12 Drawing Sheets

RING SLICER WITH EASILY REMOVABLE KNIFE AND KNIFE ASSEMBLY

FIELD OF THE INVENTION

The present invention relates to a ring slicer having an easily removable knife and knife assembly, particularly for use in slicing or flaking logs, refuse lumber, chips, or other articles of wood in a lumber mill.

BACKGROUND OF THE INVENTION

Ring slicers, also termed ring flakers or standers, are generally used in manufacturing facilities for manufacturing particle board, oriented strand board, and fiberboard such as MDF. They convert logs, refuse lumber, chips, or other articles of wood into flakes, wafers or strands for the manufactured board products. The ring slicer includes a cylindrical ring assembly for revolution about an axis of rotation. The ring assembly typically includes a large number of elongate knife assemblies, commonly 49 but which may be as many as 72. The knife assemblies support elongate knives having cutting edges extending parallel to the axis of rotation captured between annular end plates. The ring assembly rotates within a chamber into which pieces of wood to be cut or chipped are introduced.

The knives are subject to wear from the wood, and in addition rocks, metal objects and other hard foreign material carried by or with the wood also wear the knives, and may damage or break the knives as well as the knife assemblies. Accordingly, it is routinely required to remove the knives to repair or replace them, or to turn them to expose fresh cutting edges. Moreover, it is episodically required to remove and replace some or all of the knives, the knife assemblies, or both, as a result of "crashes" of the ring slicer apparatus. The machine downtime and the labor required to effect maintenance and repair are costly and desirably kept to a bare minimum.

As described in U.S. Pat. No. 5,313,696, the knives may be mounted to a portable knife assembly that slides radially into slots in the end plates of the ring assembly. Once in place, bolts are inserted through holes in the end plates into threaded holes in the knife assembly to hold the knife assembly in place. In turn, the knife is similarly mounted to the knife assembly with bolts extending through holes in the knife into threaded holes in the knife assembly.

One problem with this approach is that the bolt holes require a tolerance that permits the knife or knife assemblies to move or creep within the ring assembly and thereby to become misaligned or to loosen as a result of the large cutting forces encountered during operation. Moreover, removing the knife from the ring slicer requires both removing the knife assembly from the ring assembly and removing the knife from the knife assembly.

To hold the knife assembly more securely to the ring assembly, the knife assembly may be provided with protruding keys that extend axially into corresponding keyholes in the end plates. The keys and keyholes can be provided with a minimal tolerance of fit that maintains the positional integrity of the knife assembly. However, a major disadvantage of this approach is that the knife assemblies may no longer be simply slid radially away from the ring assembly for maintenance or repair. Rather, the end plates must be axially spaced apart a sufficient amount to permit the projecting keys to clear the end plates, requiring that the entirety of at least one end plate be decoupled from all of the knife assemblies.

It is often necessary to remove a knife from the knife assembly under conditions where it is not otherwise necessary to remove the knife assembly from the ring assembly. U.S. Pat. No. 5,937,923 addresses this problem by providing a clamp for the knife that is biased outwardly by springs disposed in spring holes in the knife assembly, for unclamping the knife without requiring removal of the clamping bolts.

A disadvantage of the mechanism is that it requires the clamp to move radially, and while a necessary indexing of the clamp is provided to seat the clamp into proper position when it is tightened, this is provided in the form of sliding surfaces that wear over time so that the position of the clamp and, therefore, the knife are permitted to wander. Another disadvantage of the mechanism is that it is difficult to remove cut wood fibers introduced into the spring holes when the clamp is loosened. It is yet another disadvantage of the mechanism that the spring forces produced by the multiple compression springs must be well matched to prevent binding of the clamp.

Accordingly, there is a need for a ring slicer having an easily removable knife and knife assembly that provides for positive maintenance of the position of the knife in the ring slicer as well as easy removal of the knife and knife assembly therefrom.

SUMMARY OF THE INVENTION

The invention disclosed herein is a ring slicer having an easily removable knife and knife assembly. Within the scope of the invention, there is an apparatus for cutting an article of wood, comprising a ring assembly comprising two end plates for rotation about an axis of rotation and a plurality of knife assemblies. Each assembly comprises an elongate knife having a cutting edge extending along an elongate axis, a base, and a clamp for clamping the knife to the base. The assemblies are provided for installation between the end plates by one or more bolts extending through one or both of the end plates into the respective bases.

According to one aspect of the invention, the bases include one or more first apertures and at least one of the end plates includes a corresponding set of one or more second apertures therethrough for receiving respective dowel pins. The first apertures are adapted to snugly slidingly receive the respective dowel pins within a range defined by a first position in which the respective dowel pins extend into at least one of the end plates to a second position in which the respective dowel pins are substantially wholly received within the respective first apertures.

According to another aspect of the invention, for each knife assembly, the clamp includes an upper clamping member that is mounted to the base so that a portion of the upper clamping member is cantilevered from the base. Each knife assembly includes provision for at least one bolt extending through the respective portion of the upper clamping portion into the respective base wherein tightening the bolt elastically deflects the portion of the upper clamping member against one side of said knife.

Therefore, it is an object of the present invention to provide a novel and improved ring slicer having an easily removable knife.

It is another object of the present invention to provide a novel and improved ring slicer having an easily removable knife assembly.

These and other objects, features and advantages of the present invention will be more readily understood upon consideration of the following detailed description of the invention, taken in conjunction with the following drawings.

DETAILED DESCRIPTION OF A PREFERRED EMBODIMENTS

Figure 1:
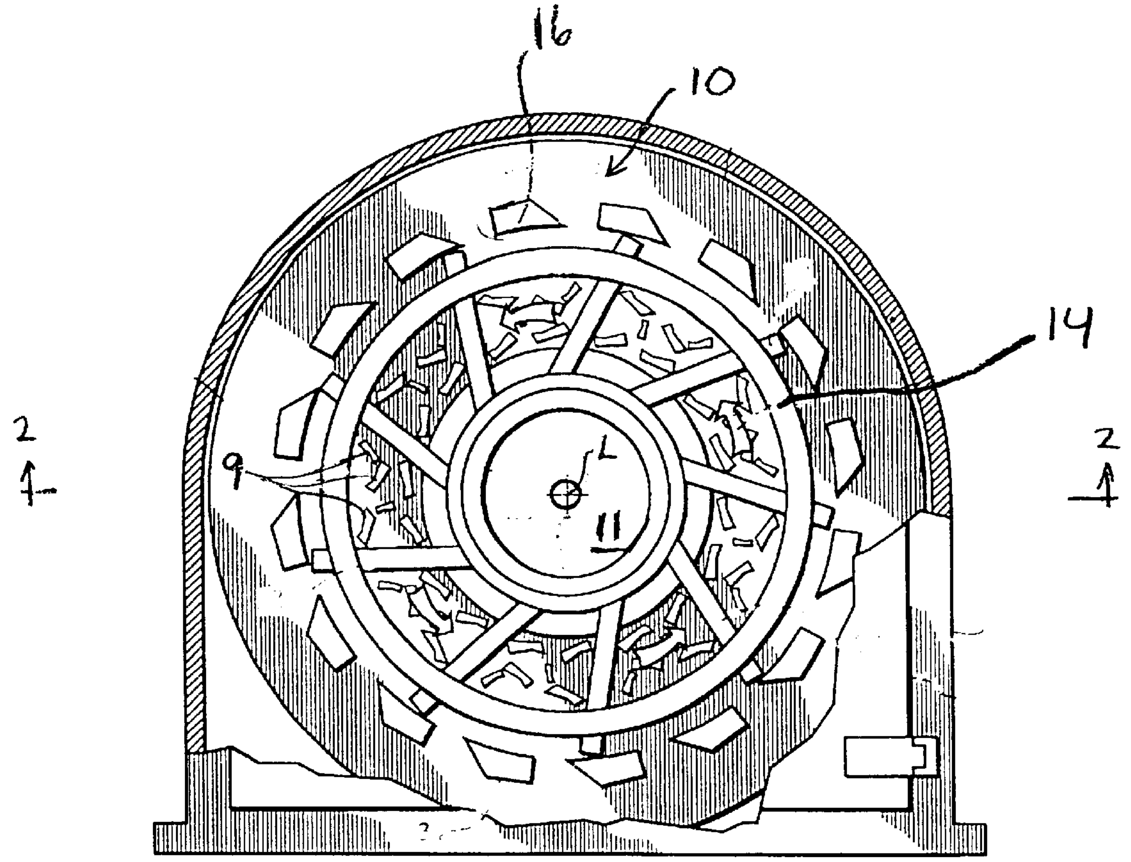
FIG. 1 is a front, partially cut-away view of a prior art ring slicer.
Figure 2:
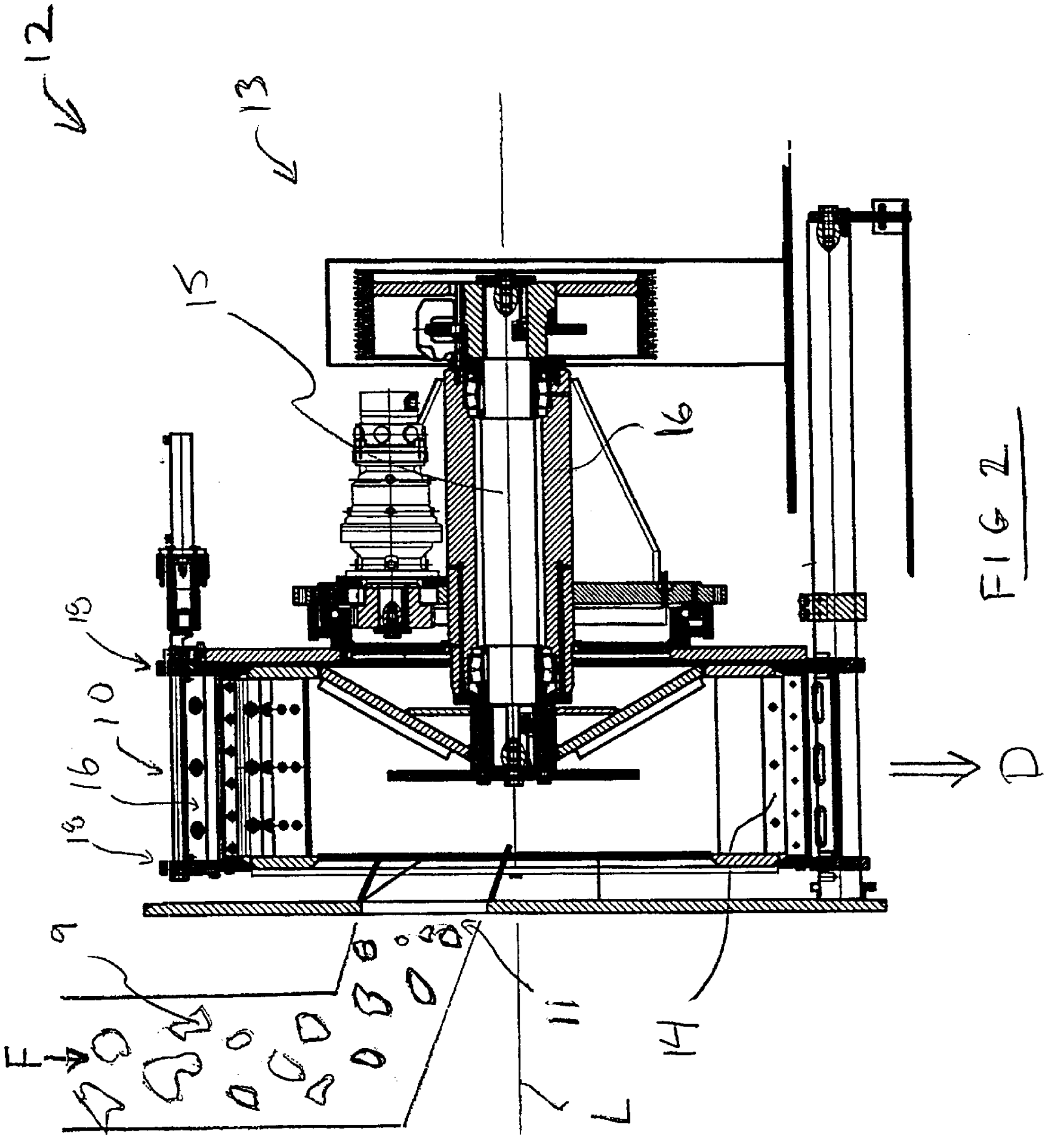
FIG. 2 is a plan, section view of the ring slicer of FIG. 1, taken along a line 2—2 thereof.

Referring to FIGS. 1 and 2, a prior art ring slicer 12 is shown, such as disclosed in U.S. Pat. No. 5,937,923. The ring slicer has a ring assembly 10 that is caused to rotate about an axis of rotation "L." The ring assembly 10 has a number of cutting knife assemblies 16 for cutting and chipping pieces of wood 9 that flow in the direction indicated as "F" in FIG. 2) into the apparatus through an opening 11. The ring slicer also includes a "rotor" 14 that counter-rotates with respect to the ring assembly 10 about the axis "L," to sling the pieces of wood 9 against the knives of the ring assembly. A drive mechanism 13 includes respective motors (not shown) for driving the rotor through an arbor shaft 15 and for driving the ring assembly 10 through a coaxially disposed drive-shaft 17. The knife assemblies 16 are captured between two annular rings 18 (not shown in FIG. 1).

The ring slicer 12 is particularly adapted to manufacture particleboard; however, with suitable adaptation the ring slicer may be used to manufacture oriented strand board as well. While either of these are preferred contexts for the present invention, the principles of the invention may be applied to any cutting apparatus, particularly any cutting apparatus for processing articles of wood.

Figure 3:
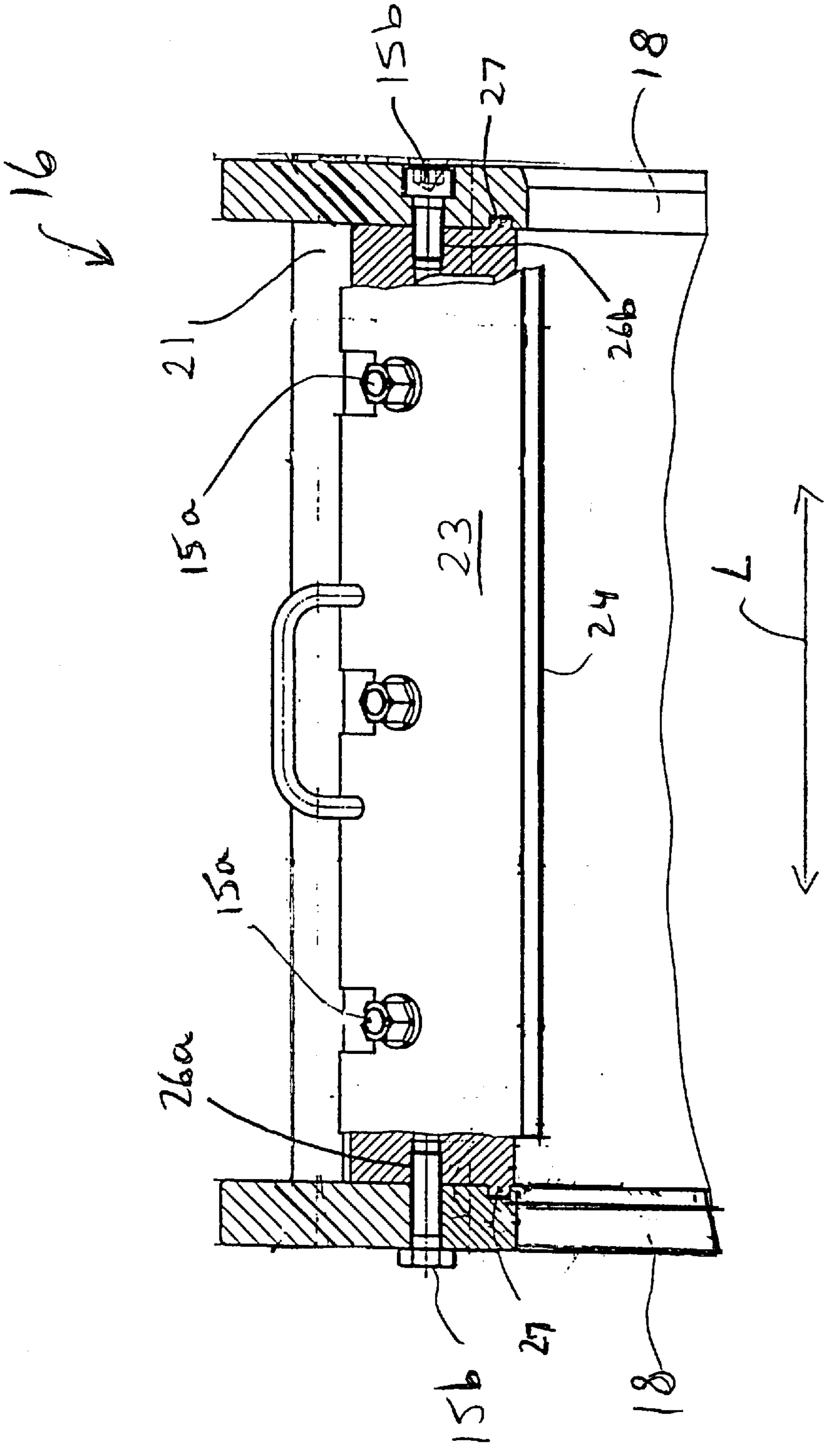
FIG. 3 is a partially cut-away, elevational view of a prior art knife assembly for the ring slicer of FIGS. 1 and 2.

Turning to FIG. 3, a prior art knife assembly 16 is shown, captured between the two annular rings 18 of the ring assembly shown in FIG. 2. The knife assembly 16 has an elongate body 21 to which is directly bolted, by use of bolts 15*a,* an elongate knife 23 having a cutting edge 24. The body includes threaded holes at ends 26*a,* 26*b* thereof for bolting the body between the rings 18 by use of bolts 15*b*. The body also includes respective projecting keys 27 at the ends for extending into mating keyholes in the rings, the reversal of the keys and keyholes being functionally equivalent. While the bolts 15 hold the ring assembly together, the keys and keyholes are used to locate the knife assemblies with respect to the rings and thereby prevent creep of the knife assembly resulting in misalignment during use. A similar strategy could be used to key the knife 23 to the body 21.

To remove the knife 23 from the knife assembly 16 when it is installed between the rings 18 requires complete removal of all of the bolts 15*a* of the knife assembly. To remove the knife assembly 16 from the ring assembly 10 requires removing the bolts 15*b*, and moving the rings 18 axially far enough apart so that the projecting keys 27 clear the inside faces 29 of the rings 18 so that the knife assembly can be slid outwardly from the ring assembly. This latter step requires at least loosening and typically completely removing the bolts 15*b* for every knife assembly in the ring assembly. Where there are typically 49 or as many as 72 knife assemblies in the ring assembly, this is an objectionably laborious and time consuming process.

Figure 4:
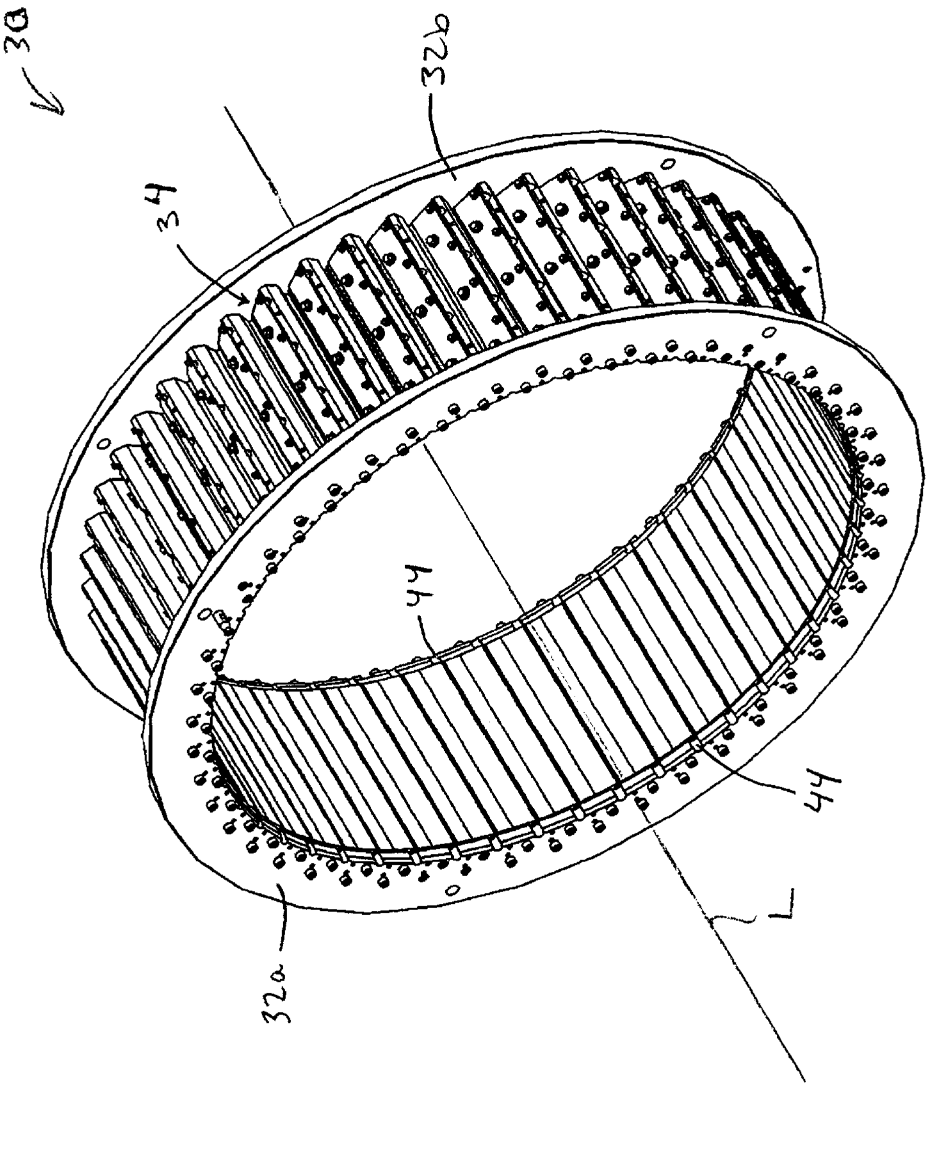
FIG. 4 is a pictorial view of a ring assembly according to the present invention.

Turning to FIG. 4, a ring assembly 30 according to the present invention is shown that substantially reduces the time and labor required to change either the knives of the knife assemblies, or the knife assemblies themselves.

The ring assembly 30 includes two end plates 32*a,* 32*b* which are preferably but not necessarily annular in shape. Captured between the two end plates 32 are a plurality of individual knife assemblies 34. There are typically 49 knife assemblies, but the number of knife assemblies may vary considerably. For example, ring slicers are available with as few as 32 knife assemblies and as many as 72 knife assemblies.

Figure 5:
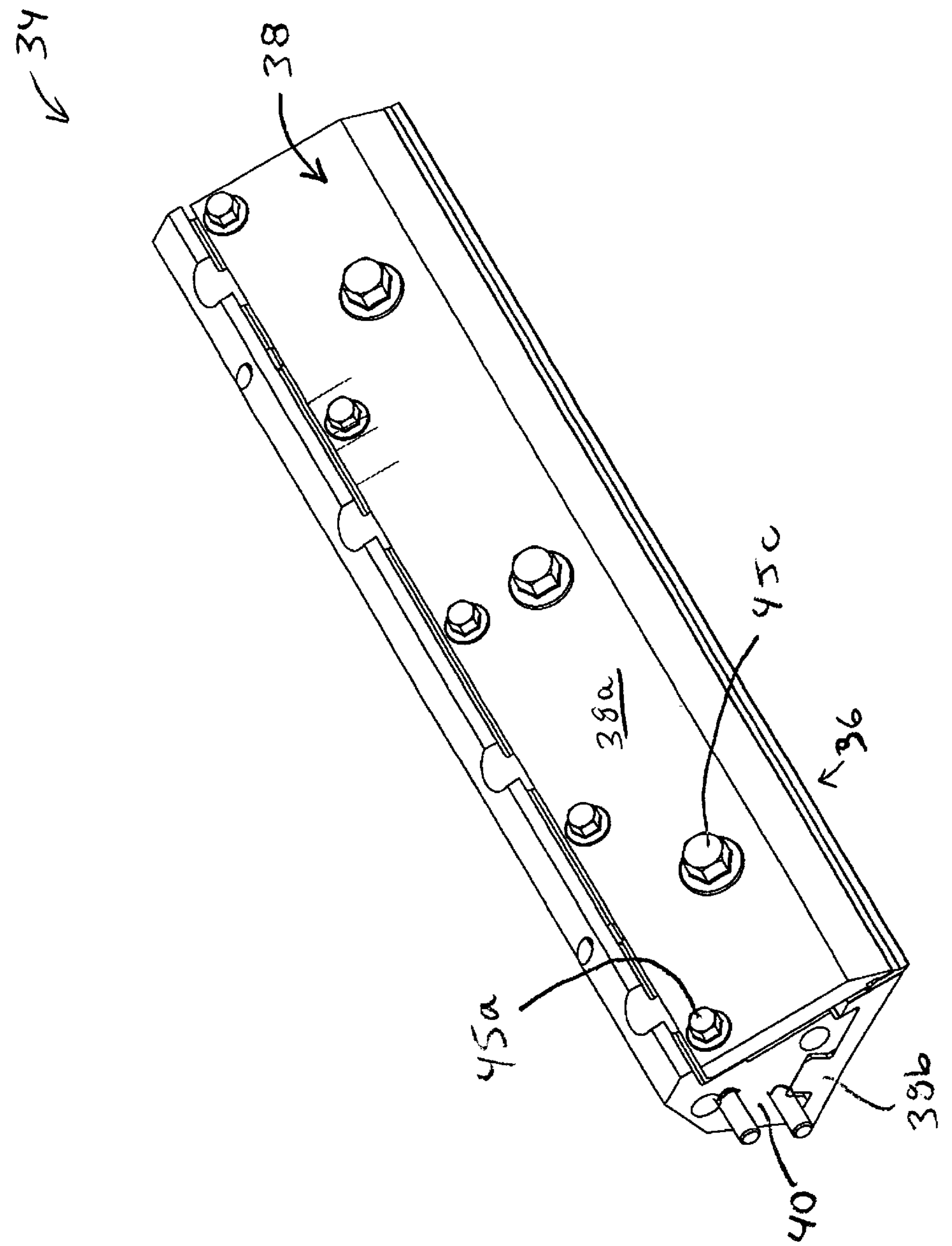
FIG. 5 is a pictorial view of a knife assembly according to the present invention.
Figure 6:
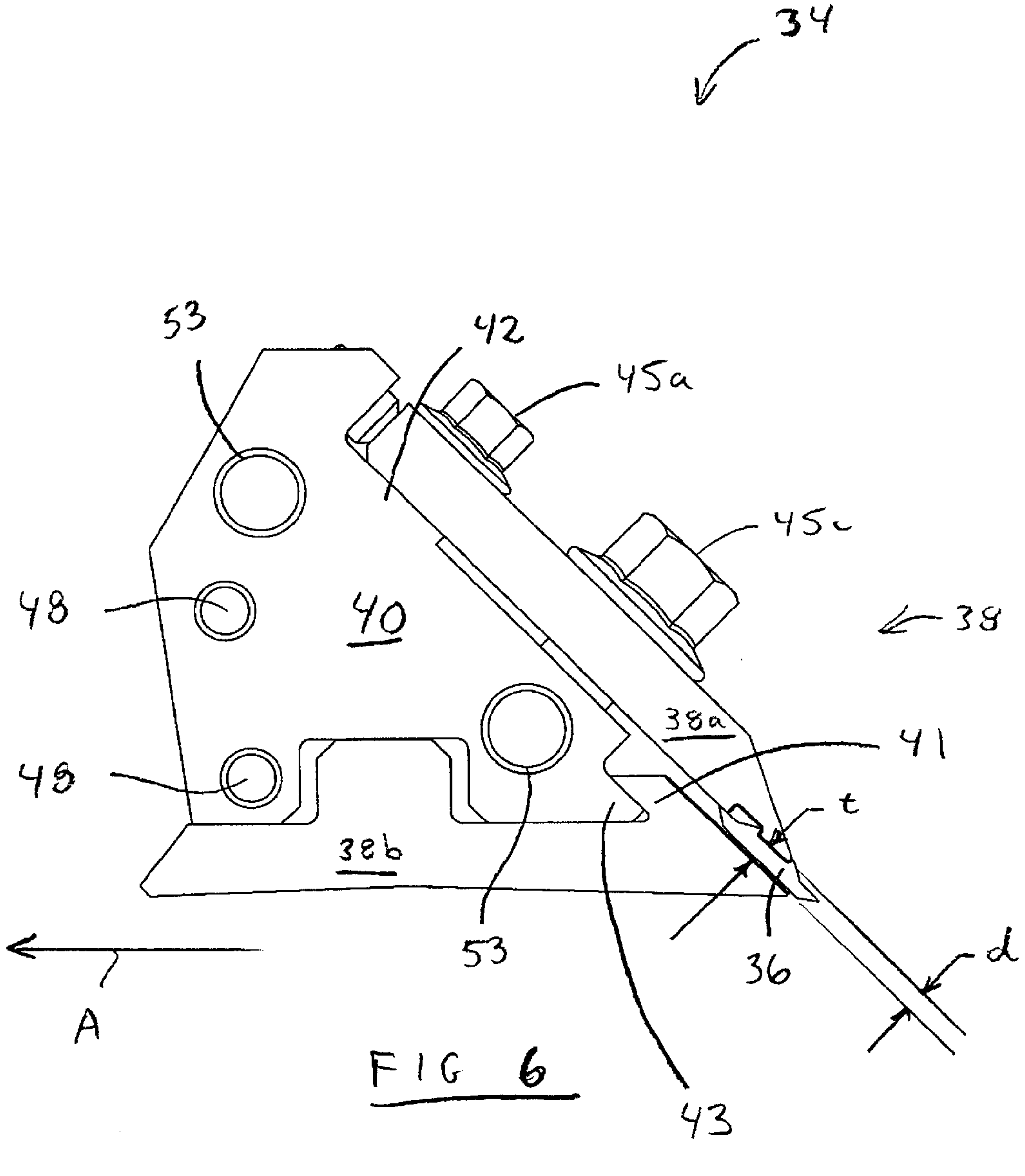
FIG. 6 is an end view of the knife assembly of FIG. 5.
Figure 7:
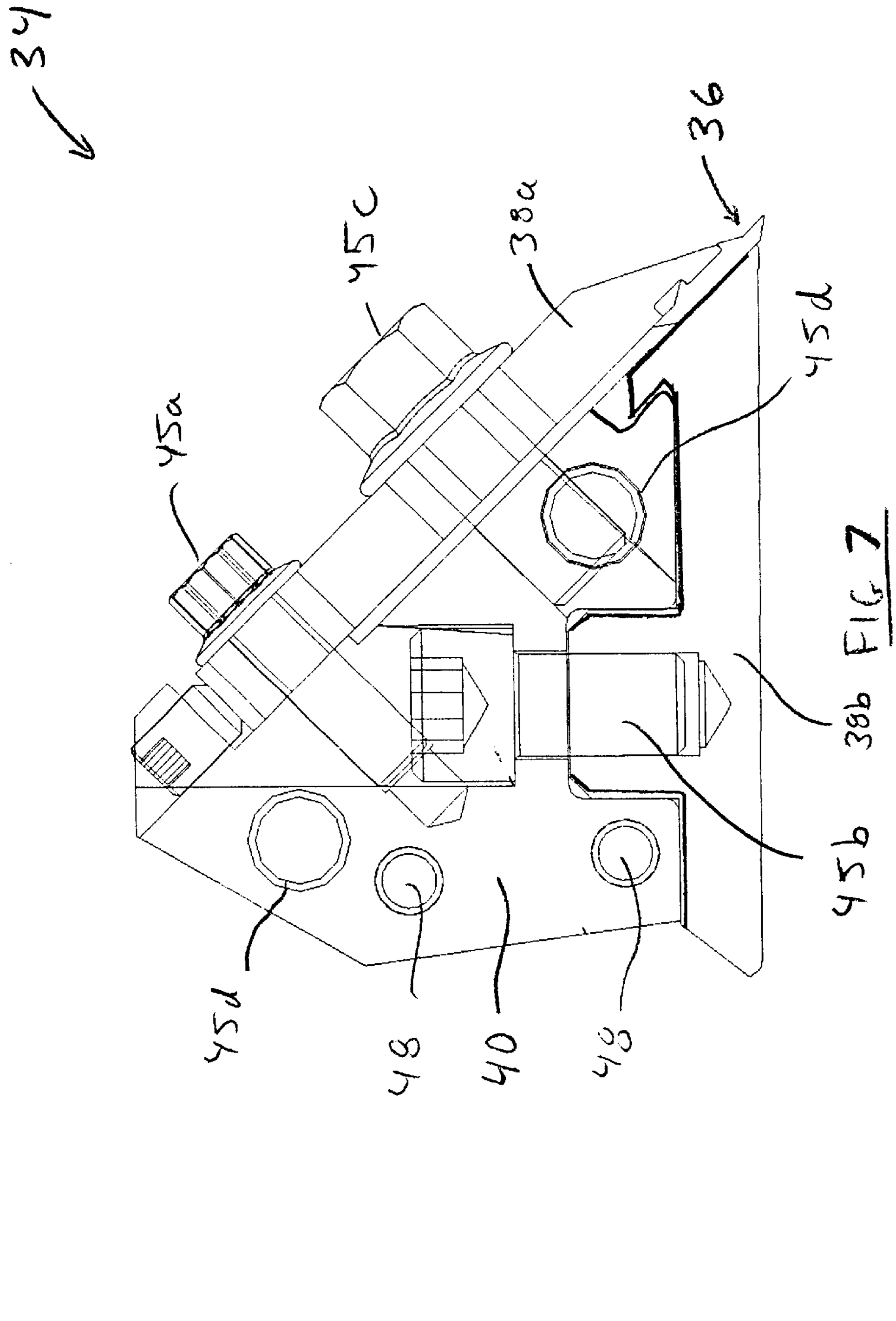
FIG. 7 is the end view of FIG. 6 showing selected phantom lines.
Figure 8B:
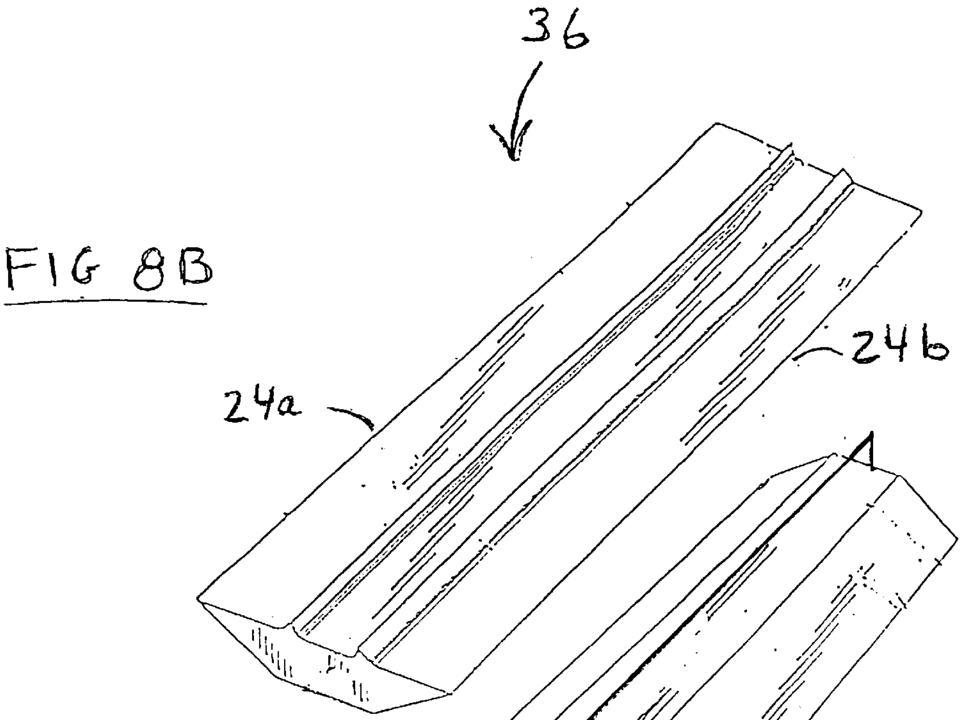
FIG. 8B is a bottom pictorial view of the knife of FIG. 8A.
Figure 8A:
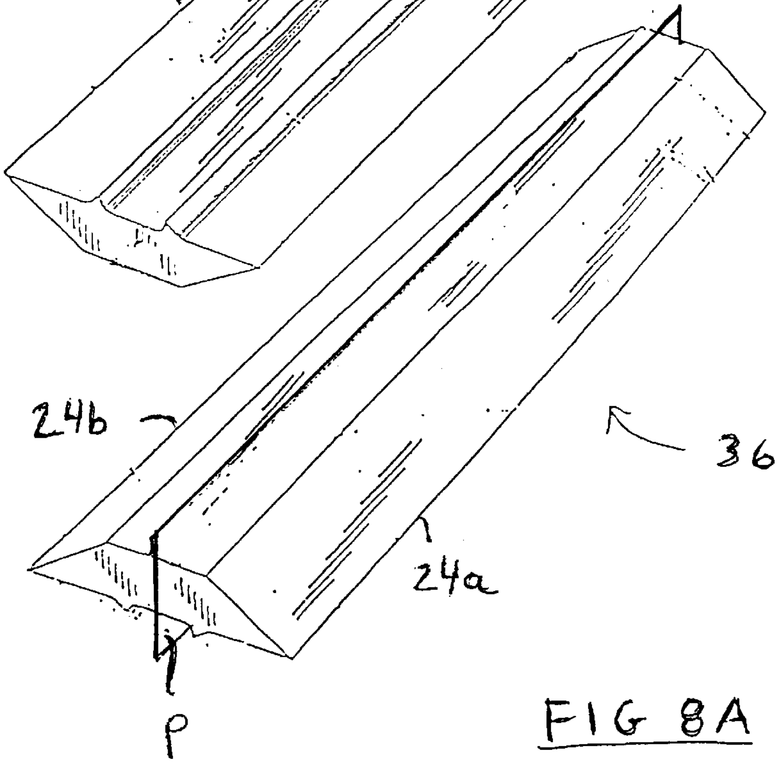
FIG. 8A is a top pictorial view of a knife for use in the knife assembly of FIG. 5.

FIGS. 5 and 6 show a knife assembly 34 according to the present invention. The knife assembly includes a knife 36, a clamp 38 and a base 40. The clamp 38 includes an upper clamping member 38*a* and a wearshoe 38*b* that functions as a lower clamping member. Both the wearshoe and the upper clamping member are bolted to the base such as shown in FIG. 7. A preferred knife 36 for use in the knife assembly 34 is also shown in FIGS. 8A and 8B. Preferably, the knife 36 has two opposed cutting edges 24*a* and 24*b.*

The knife 36 is clamped to the base 40 by the clamp 38. Particularly, the knife is held between the upper clamping member 38*a* and the wearshoe 38*b.* The upper clamping member is bolted to the base 40 by use of a bolt 45*a,* and the wearshoe is bolted to the base by use of a bolt 45*b* (FIG. 7). However, the knife is not yet held by the clamp 38 until a clamp bolt 45*c* is tightened.

Particularly, the base has a raised support portion 42 (FIG. 6) on which one end of the upper clamping member 38*a* is supported. The upper clamping member is cantilevered out from this support and without any deflection is spaced apart from the wearshoe by a distance "d" that is greater than the thickness "t" of the knife. Tightening the clamp bolt 45*c* therefore deflects the cantilevered upper clamping member 38 elastically so as to bring it into contact with the knife, and further tightening of the clamp bolt tightens the clamp. Accordingly, loosening the clamp bolt 45*c* releases the clamping force on the knife and the upper clamping member relaxes its elastic deflection, freeing the knife for easy removal from the knife assembly 34. The cantilever arrangement of the upper clamping member provides the outstanding advantage, as compared to prior art spring-clamp mechanisms, of being unaffected by packing and manufacturing tolerance. This is because the cantilever can be deflected despite any cut wood fibers caught between the upper clamping member and the base, and because the entire upper clamping member functions as a single spring, the characteristics of which do not have to cooperate with those of any other springs.

Preferably, there is about a 0.004" to 0.008" clearance between the upper clamping member 38 and the knife when the clamp bolt 45*c* is fully loosened and, therefore, the upper clamping member 38 is in its relaxed, undeflected, state. Multiple instances of the clamp bolt 45*c* are preferably provided such as shown in FIG. 5 to ensure that the required clamping force can be exerted and maintained.

The wearshoe 38*b* and the base 40 advantageously include cooperatively locking portions 41 and 43, respectively, that function to index, strengthen and secure the attachment of the wearshoe to the base. Particularly, the locking portions 41 and 43 prevent movement of the wear-shoe with respect to the base in the direction indicated as "A," and thereby ensure that the distance "d" is and remains fixed.

Figure 9:
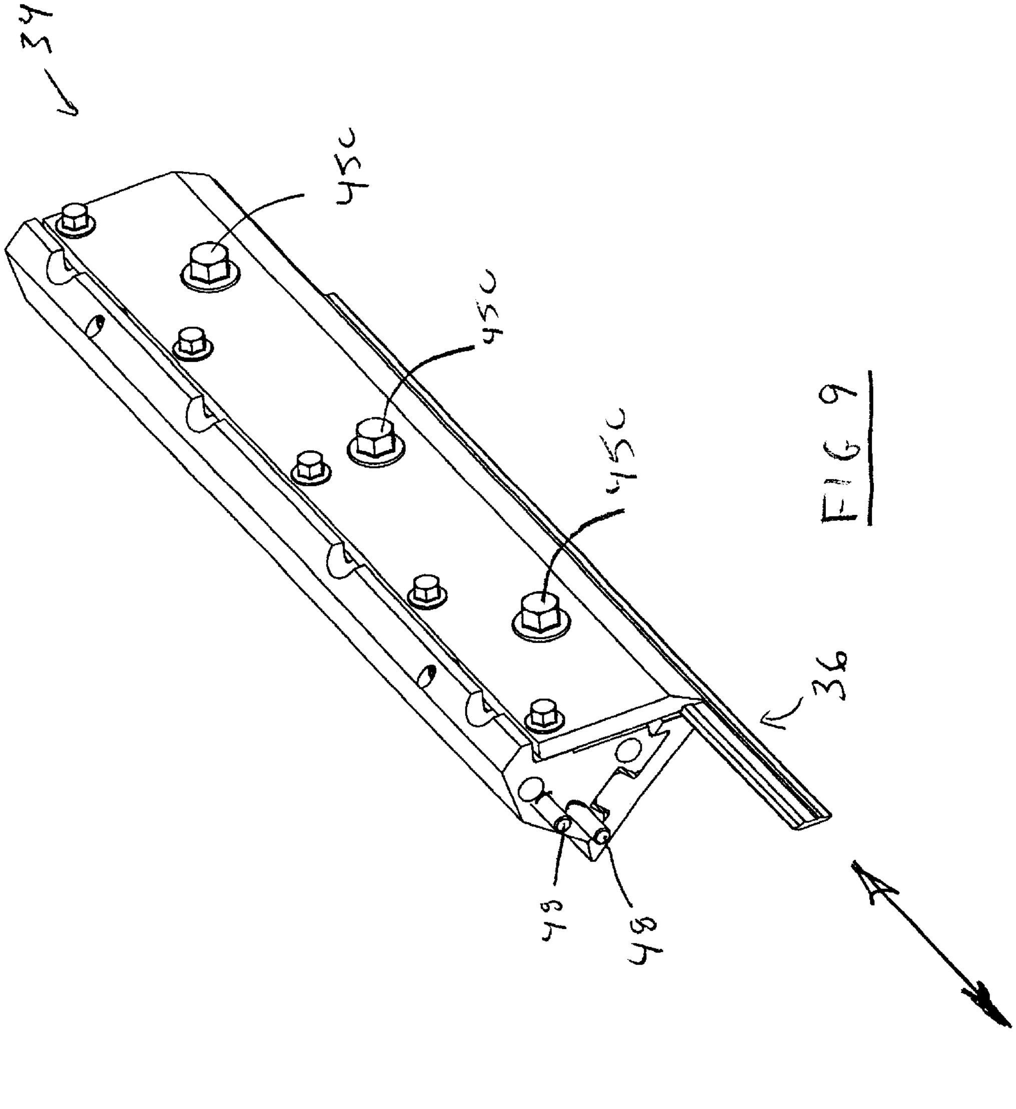
FIG. 9 is a pictorial view of the knife assembly of FIG. 5, showing partial removal of the knife therefrom.
Figure 10:
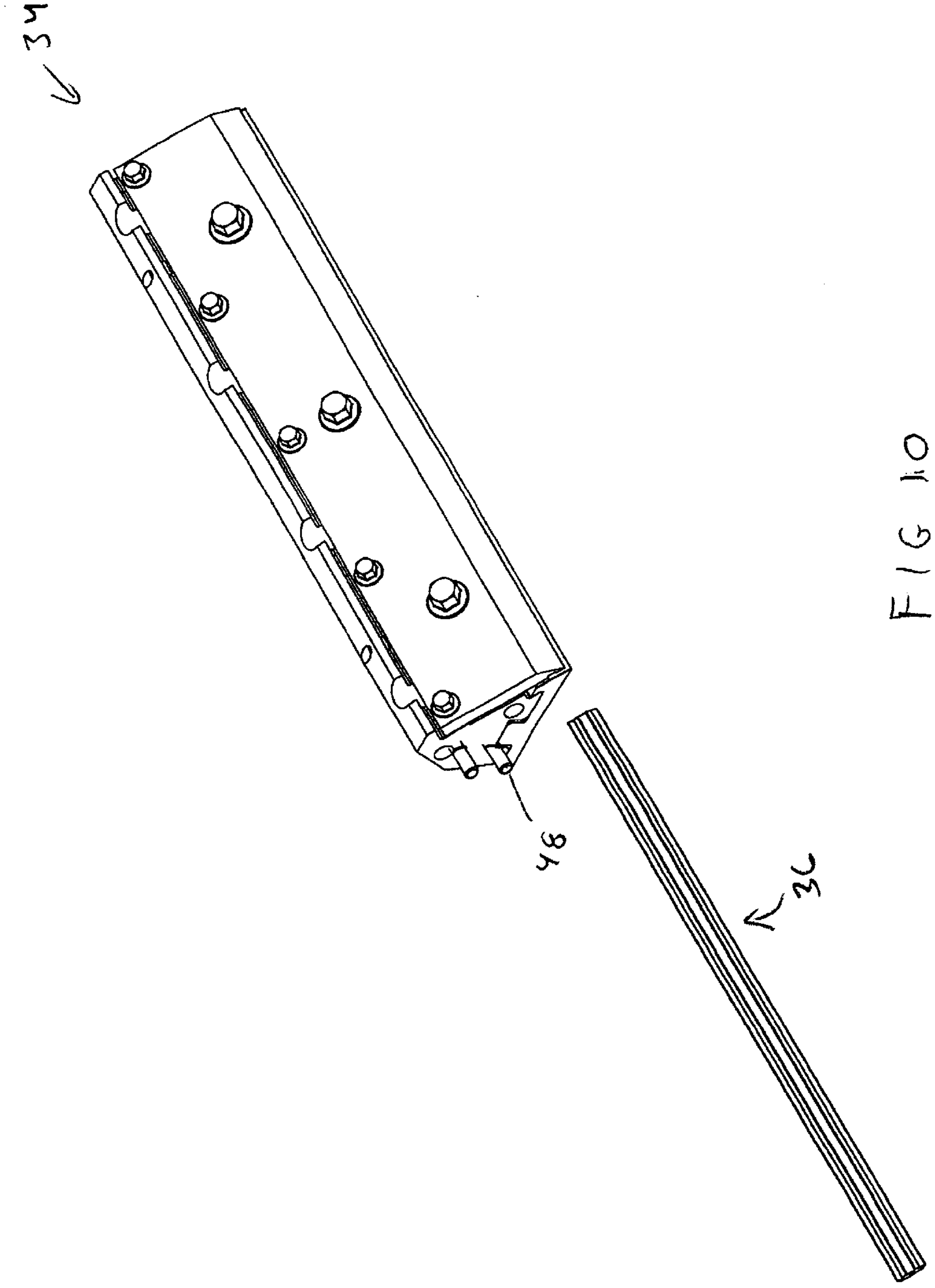
FIG. 10 is a pictorial view of the knife assembly of FIG. 5, showing complete removal of the knife therefrom.
Figure 11:
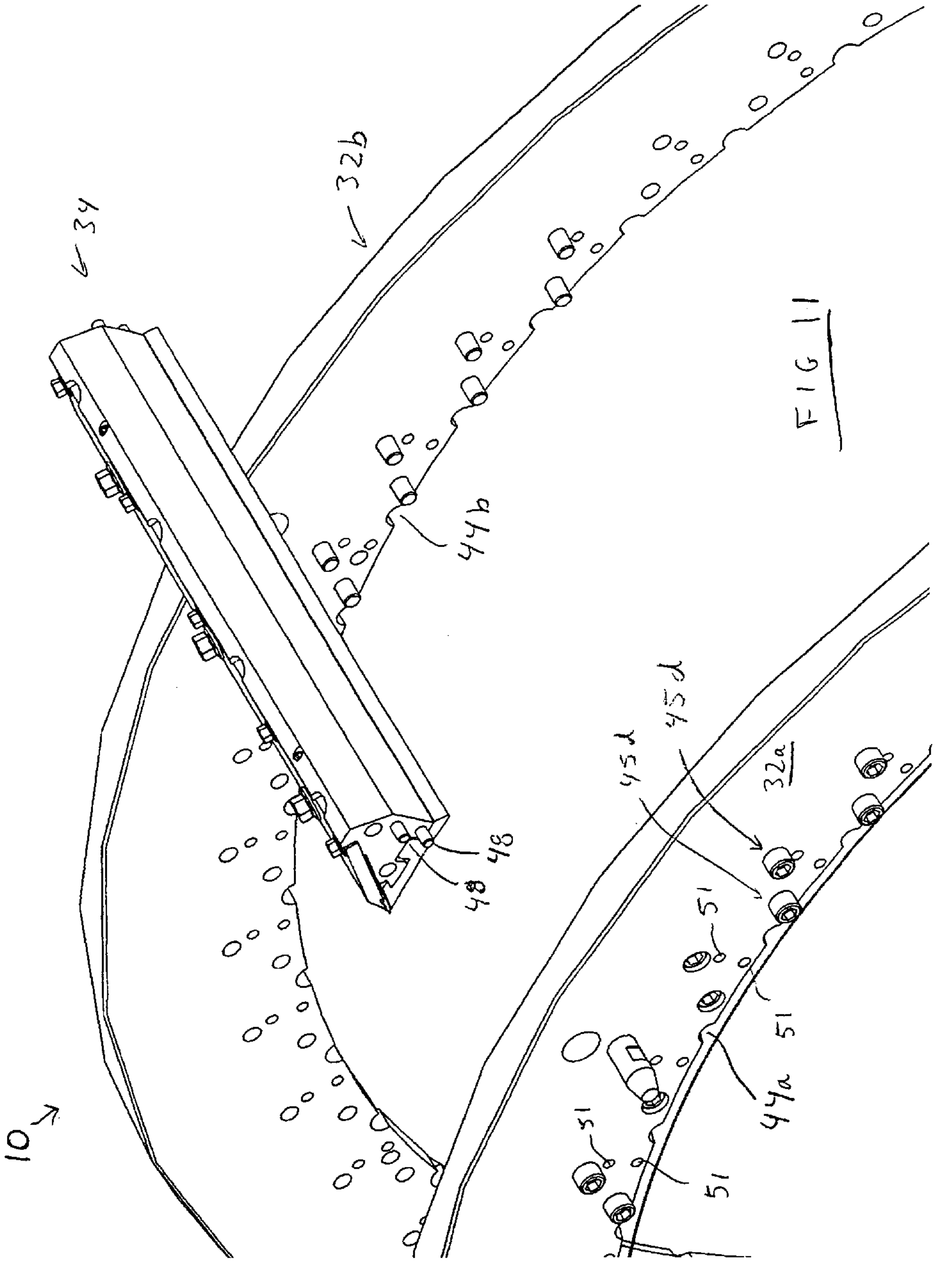
FIG. 11 is a pictorial view of a portion of the ring assembly of FIG. 4, showing removal of the knife assembly therefrom.

Referring to FIGS. 9 and 10, the knife 36, once unclamped by loosening the clamp bolt(s) 45*c*, can be installed into or removed from the knife assembly 34 in the direction of the arrows. Turning back to FIG. 4, these operations can be accomplished while the knife assembly is still in place in the ring assembly 30 simply by sliding the knife axially out of the ring assembly 34 through a corresponding slot 44 (see also FIG. 11) in the end plates 32. It is an outstanding advantage of the ring assembly 30 that neither the clamp bolts nor the knife assembly needs to be removed in order to remove the knife.

Preferably, slots 44 corresponding to a particular knife assembly 34 are provided on both end plates 32*a* and 32*b* (FIG. 11), so that the knife may be conveniently removed through one a slot in one of the end plates, e.g., 32*a*, by pushing another knife into place through the corresponding slot in the other end plate. For example, a knife 36 may be pushed into the knife assembly 34 while the knife assembly is installed in the ring assembly 10 of FIG. 11 through slot 44*b* in the end plate 32*b*. This will push the knife already in the knife assembly 34 out the slot 44*a* of the end plate 32*a*, though the knife could also be removed through a single slot, and the knife need not be replaced with another knife. Rather, alternatively, where the knife 36 has double cutting edges 24*a* and 24*b* such as shown in FIGS. 8A and 8B and the cutting edge 24*a* is worn, the knife may be advantageously turned end-for end and reinstalled through the slot to expose or present a fresh cutting edge 24*b* of the same knife 36. This function is facilitated by providing that the knife 36 is symmetric with respect to being turned end-for-end, i.e., about the bisecting plane "P" in FIG. 8A.

Figure 12:
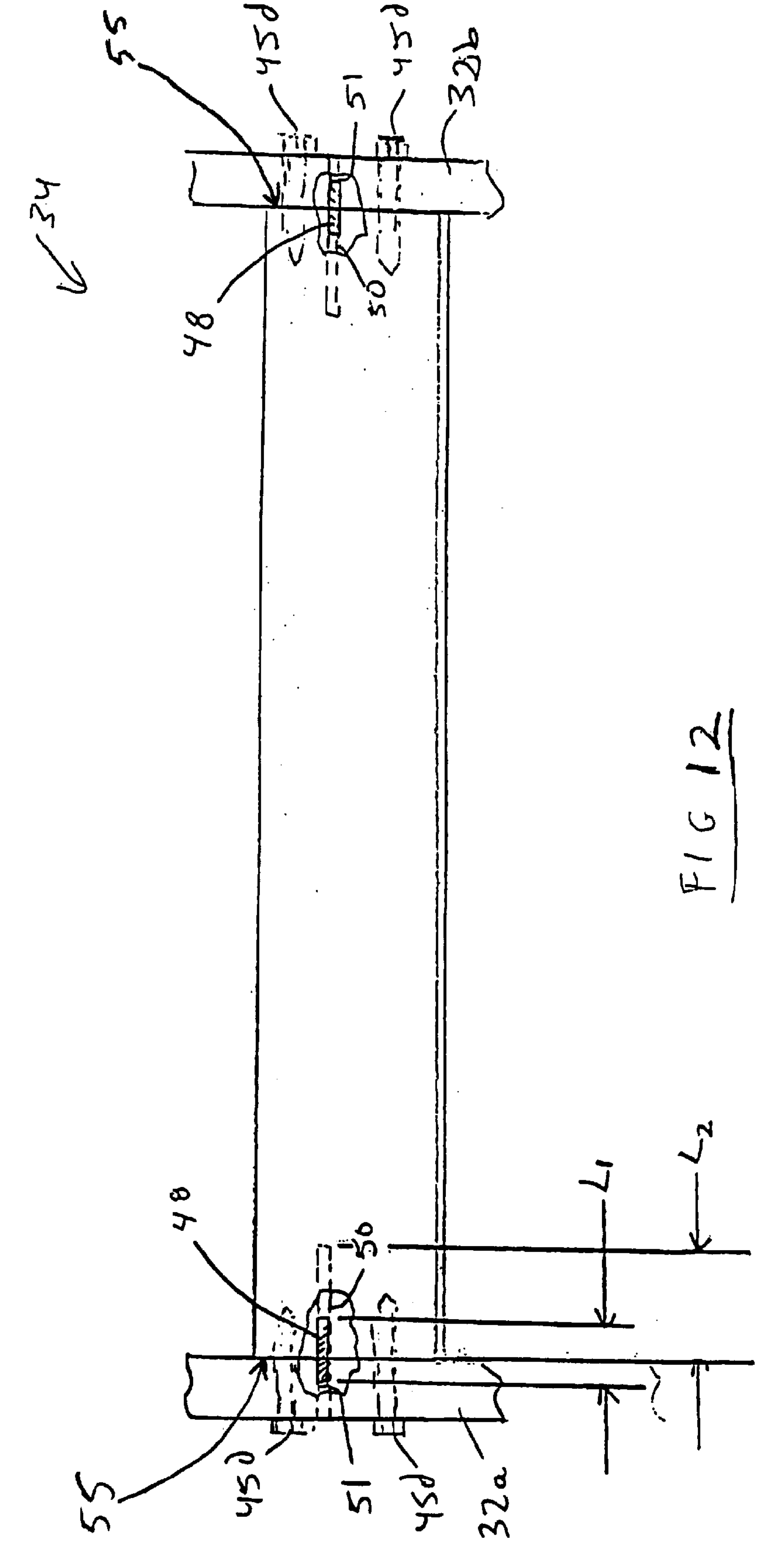
FIG. 12 is a side elevation of the knife assembly of FIG. 5.
Figure 3:
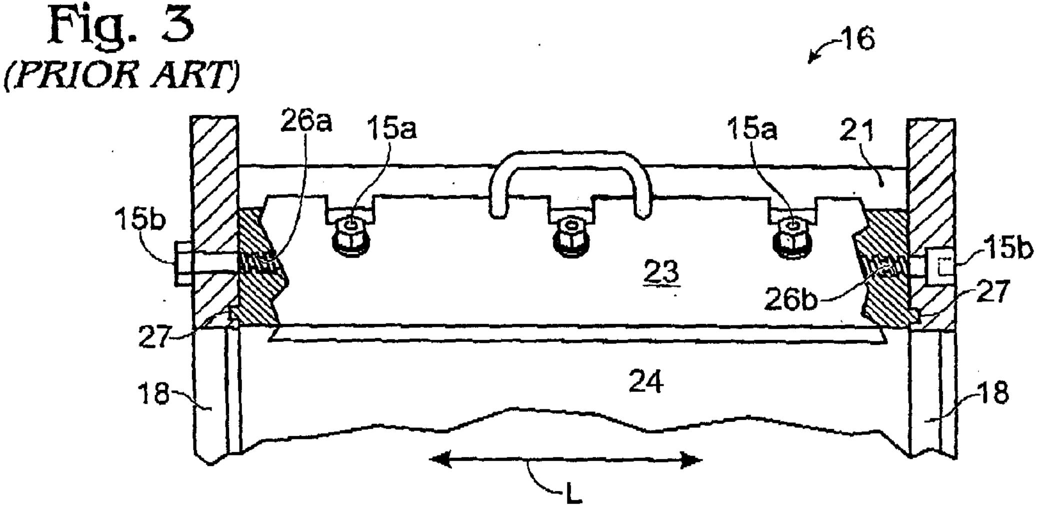
Fig. 3 (PRIOR ART)
Figure 4:
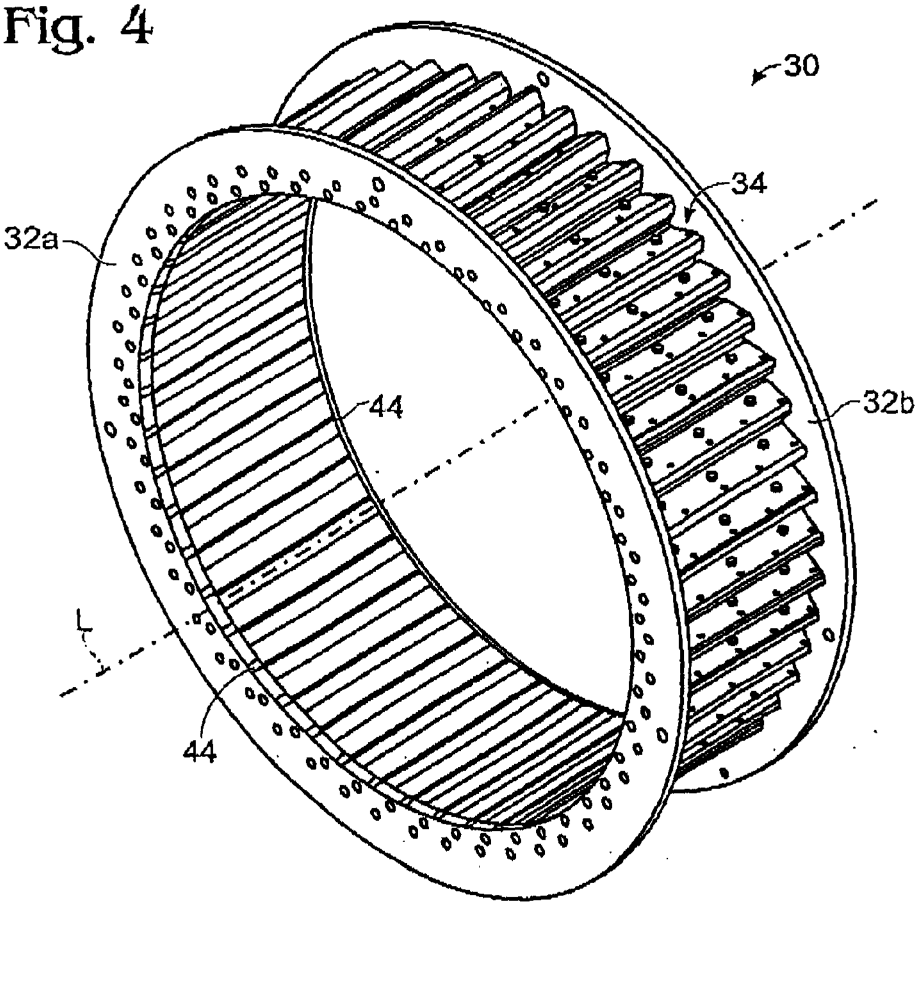
Figure 5:
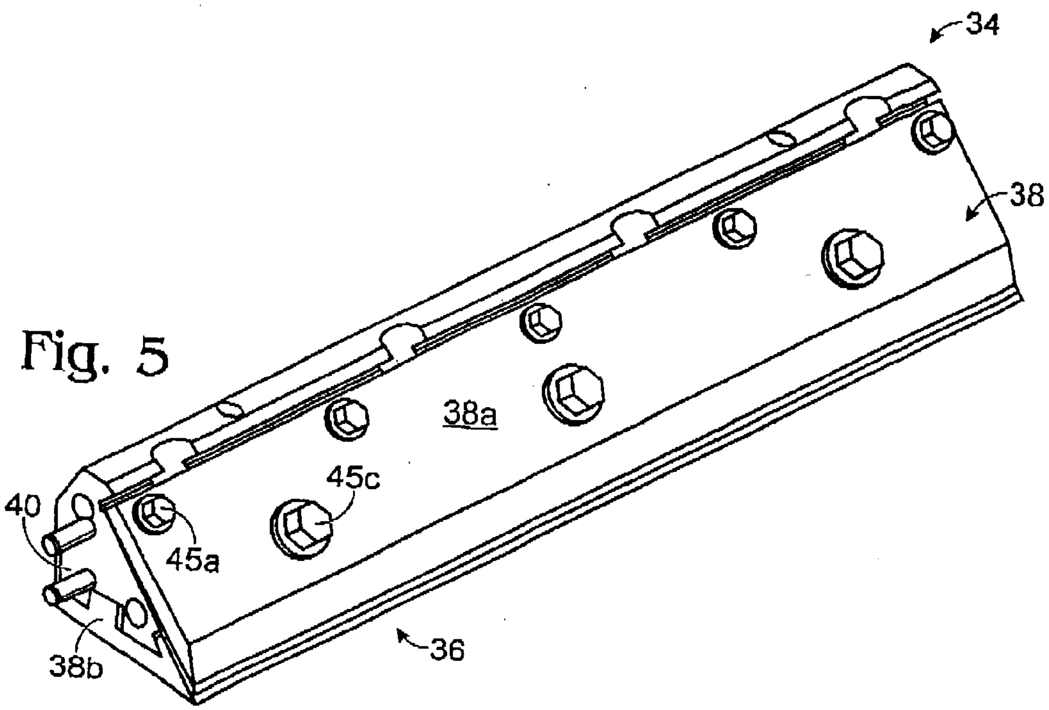
Figure 6:
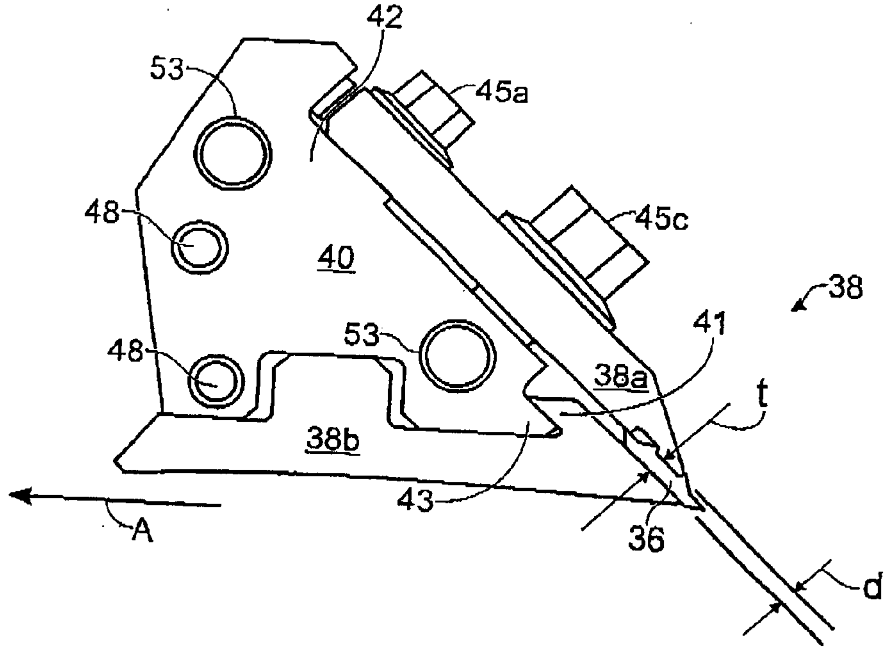
Figure 8B:
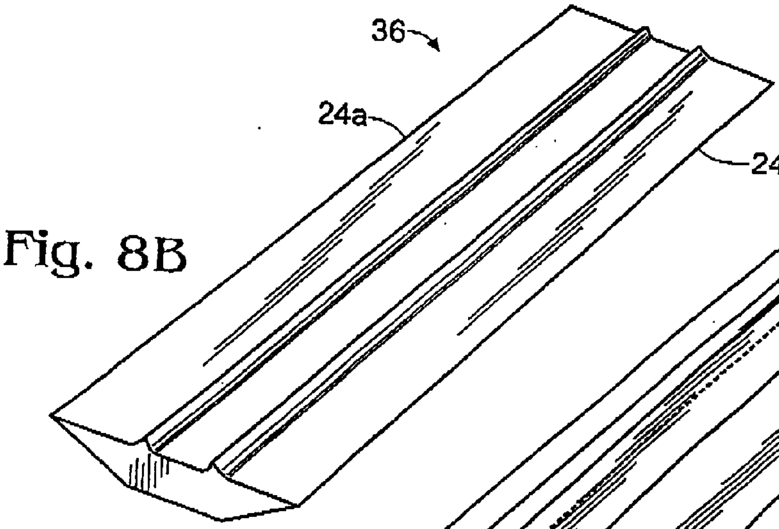
Figure 8A:
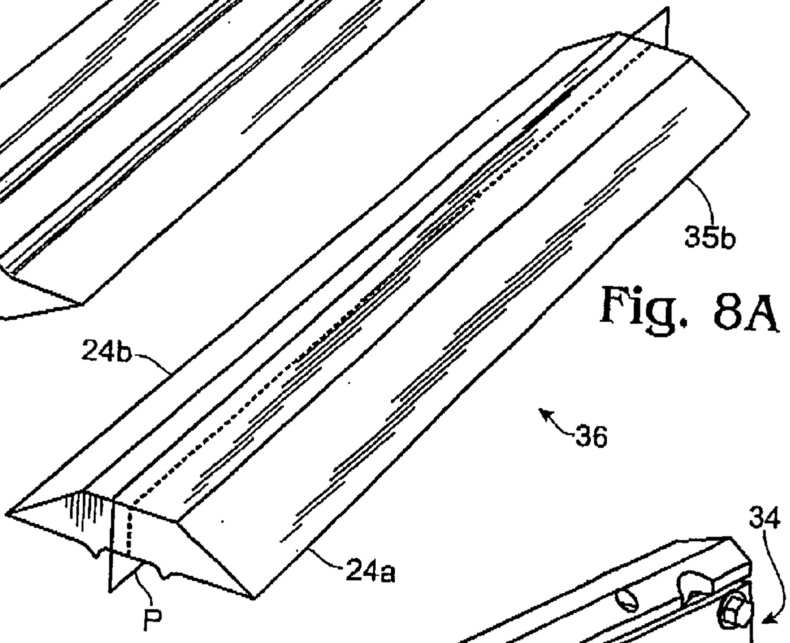
Figure 9:
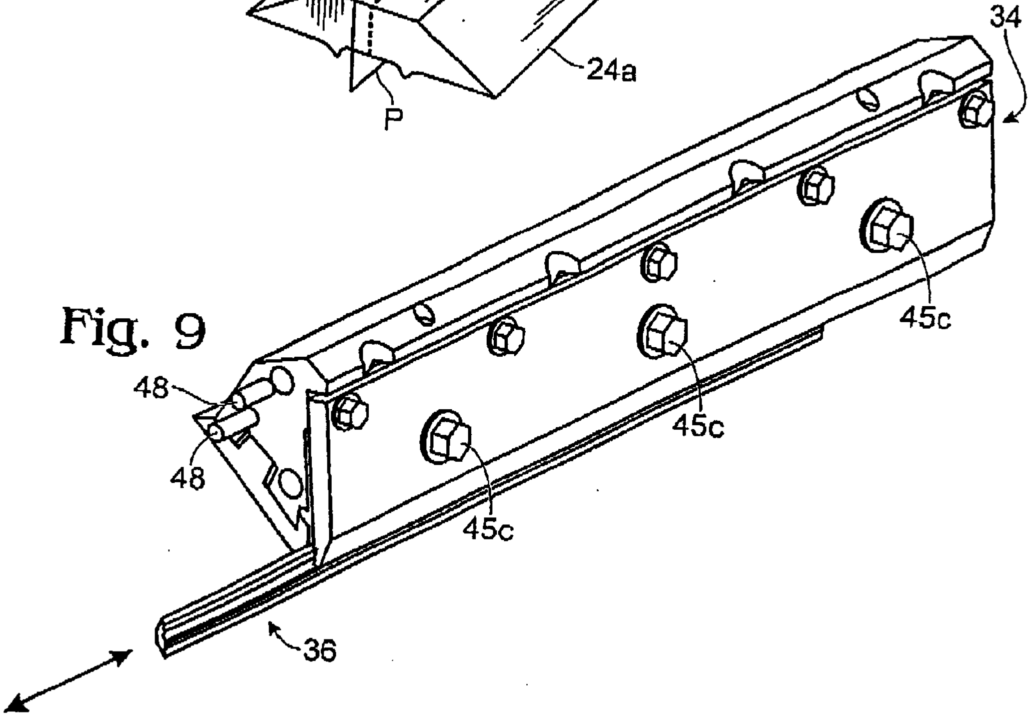
Figure 11:
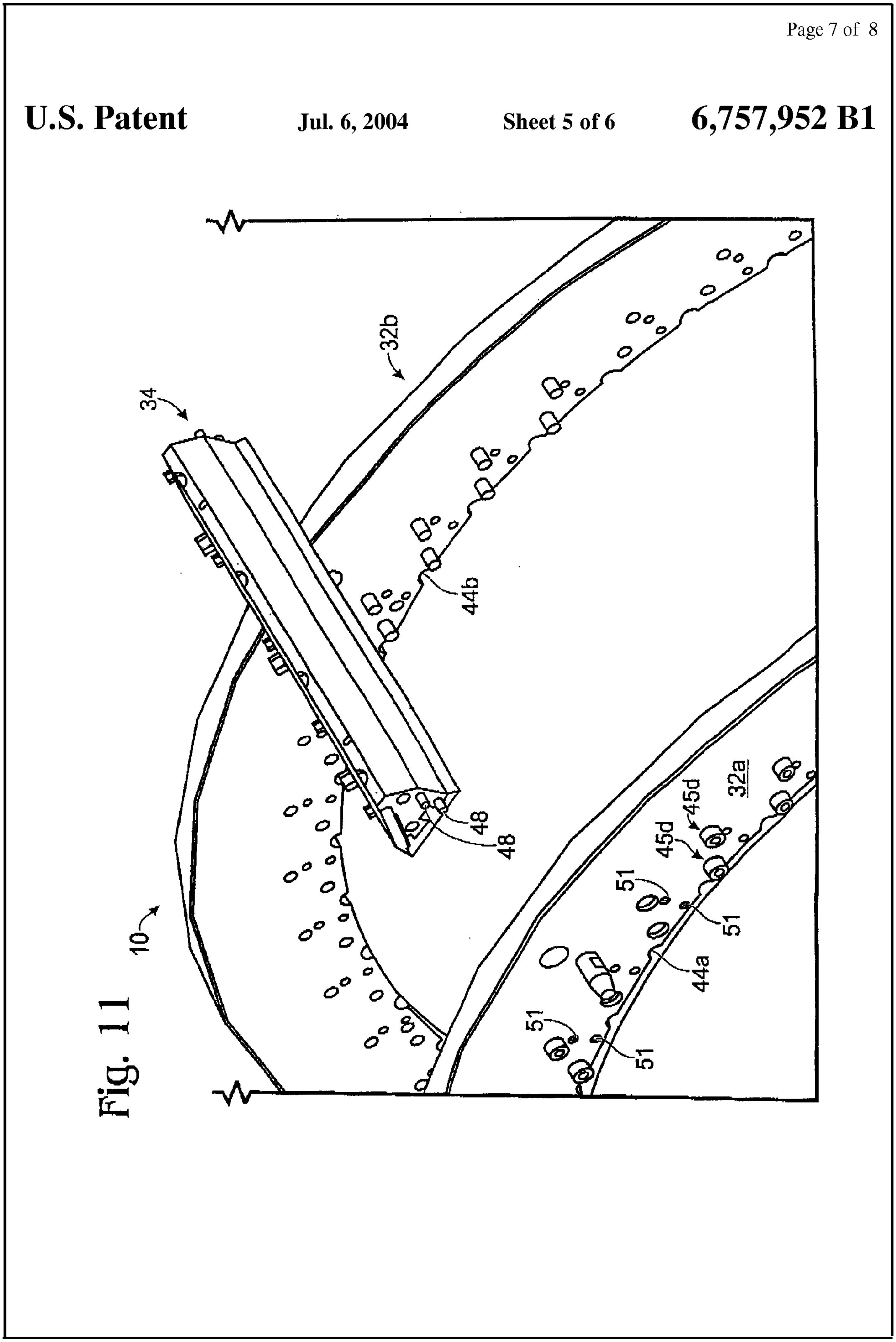
Figures 7, 10, 12:
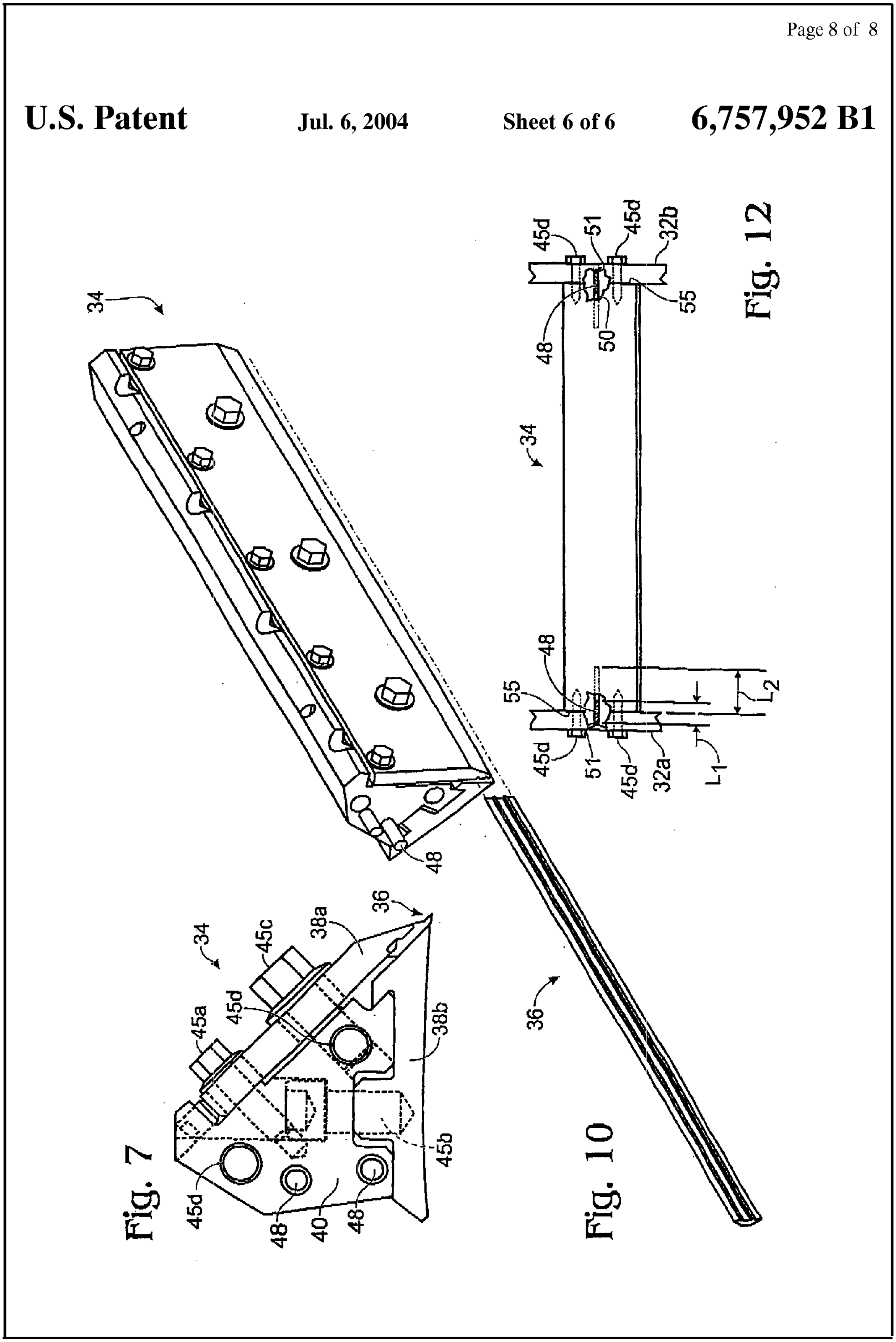

Turning to another aspect of the invention, FIGS. 6, 9, 10 and 11 show dowel pins 48 extending from the base 40. Referring to FIG. 12, the dowel pins 48 are slidingly disposed in dowel holes 50 in the base and extend into or through dowel holes 51 in the end plates 32. Bolts 45*d* (see also FIG. 7) extend through the end plates 32 into holes 53 (FIG. 6) in the base to hold the ring assembly together. The dowel pins are tight-fitting in the respective dowel holes, but are preferably slidingly movable therein by pressing or punching the pins with hand tools. The dowel holes extend deeply enough into the base that the dowel pins may be pressed or punched into the holes and wholly contained thereby, so that outer ends 49 of the dowel pins may be substantially flush with or beneath an outer end surfaces 55 of the base. Accordingly, if the length of the dowel pins is "$L_1$," the depth of the dowel holes 37 $L_2$," is preferably at least as great as "$L_1$."

In the ring assembly 30, the dowel pins are ordinarily positioned to extend from the dowel holes, into or through the plates 32, to locate the base 40 to the plates 32. However, to remove the knife assembly 34 from the ring assembly, the dowel pins on at least one end of the knife assembly may be pressed or punched into the dowel holes so that the knife assembly is free to slide radially out of the ring assembly. It is an outstanding advantage of the ring assembly 30 that the knife assembly can be removed from the ring assembly simply by removing the bolts 45*d* and pressing or punching the dowel pins on at least one end of the knife assembly into their respective dowel holes.

It is to be recognized that, while a particular ring slicer having an easily removable knife and knife assembly has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

What is claimed is:

1. An apparatus for cutting an article of wood, comprising:

a ring assembly comprising two end plates for rotation about an axis of rotation and a plurality of knife assemblies, each assembly comprising an elongate knife having a cutting edge extending along an elongate axis, a base, and a clamp for clamping the knife to the base, said assemblies for installation between said end plates by one or more bolts extending through one or both of said end plates into respective bases, wherein said bases of said assemblies include one or more first apertures and at least one of said end plates includes a corresponding set of one or more second apertures therethrough for receiving respective, corresponding dowel pins, said first apertures being adapted to snugly slidingly receive the respective said dowel pins within a range defined by a first position in which the respective said dowel pins extend into said at least one of said end plates to a second position in which the respective said dowel pins are substantially wholly received within the respective said first apertures.

2. The apparatus of claim 1, wherein both of said end plates include respective slots corresponding to said assemblies, said slots being adapted to pass respective knives of said assemblies through said end plates in the direction of elongate axes of said knives.

3. The apparatus of claim 2, wherein, for each said knife assembly, said clamp includes an upper clamping member that is mounted to said base so that a portion of said upper clamping member is cantilevered from said base, and wherein each said knife assembly includes provision for at least one bolt extending through the respective said portion into the respective said base wherein tightening said bolt elastically deflects said upper clamping member against one side of said knife and loosening said bolt permits said upper clamping member to relax so that said upper clamping member no longer makes contact with said one side of said knife.

4. The apparatus of claim 2, wherein said knife has two opposed cutting edges.

5. The apparatus of claim 1, wherein, for each said knife assembly, said clamp includes an upper clamping member that is mounted to said base so that a portion of said upper clamping member is cantilevered from said base, and wherein each said knife assembly includes provision for at least one bolt extending through a respective said portion into a respective said base wherein tightening said bolt elastically deflects said upper clamping member against one side of said knife and loosening said bolt permits said upper clamping member to relax so that said upper clamping member no longer makes contact with said one side of said knife.

6. The apparatus of claim 1, wherein said knife has two opposed cutting edges.

7. An apparatus for cutting an article of wood, comprising:

a ring assembly comprising two end plates for rotation about an axis of rotation and a plurality of knife assemblies, each assembly comprising an elongate knife having a cutting edge extending along an elongate axis, a base, and a clamp for clamping the knife to the base, said assemblies for installation between said end plates by one or more bolts extending through one or both of said end plates into respective bases of said assemblies, wherein, for each said knife assembly, said clamp includes an upper clamping member that is mounted to said base so that a portion of said upper clamping member is cantilevered from said base, and wherein each said knife assembly includes provision for at least one bolt extending through a respective said portion into a respective said base wherein tightening said bolt elastically deflects said portion against one side of said knife.

8. The apparatus of claim 7, wherein both of said end plates include respective slots corresponding to said assemblies, said slots being adapted to pass respective knives of said assemblies through said end plates in direction of said elongate axes of said knives.

9. The apparatus of claim 7, wherein said knife has two opposed cutting edges.

10. The apparatus of claim 8, wherein said knife has two opposed cutting edges.

11. A method for maintaining or repairing a ring slicing apparatus, comprising the steps of:

providing a ring assembly comprising two end plates for rotation about an axis and a plurality of knife assemblies, each assembly comprising an elongate knife having a cutting edge extending along an elongate axis, a base, and a clamp for clamping the knife to the base, said assemblies for installation between said end plates by one or more bolts extending through one or both of said end plates into respective said bases, wherein said bases include respective first apertures and one of said end plates includes respective corresponding second apertures for receiving respective dowel pins, wherein a first aperture corresponding to a selected one of said assemblies snugly slidingly receives a dowel pin that also extends into a corresponding second aperture in said one end plate so as to couple the selected assembly to said one end plate; and forcing said dowel pin through said second aperture into said first aperture so that said dowel pin no longer extends into said second aperture, thereby permitting at least an end of the selected assembly to be radially moved away from said end plates with respect to the axis of rotation.

12. The method of claim 11, further comprising providing, for each said knife assembly, that said clamp includes an upper clamping member that is mounted to said base so that a portion of said upper clamping member is cantilevered from said base, providing that each said knife assembly includes at least one bolt extending through a respective said portion into a respective said base, and tightening at least one of said bolts to elastically deflect a corresponding said portion against one side of a corresponding knife to clamp a knife.

13. A method for maintaining or repairing a ring slicing apparatus, comprising the steps of:

providing a ring assembly comprising two end plates for rotation about an axis and a plurality of knife assemblies, each assembly comprising an elongate knife having a cutting edge extending along an elongate axis, a base, and a clamp for clamping the knife to the base, said assemblies for installation between said end plates by one or more bolts extending through one or both of said end plates into respective said bases of said assemblies, wherein, for each knife assembly, said clamp includes an upper clamping member that is mounted to said base so that a portion of said upper clamping member is cantilevered from said base;

providing that each said knife assembly includes at least one bolt extending through a respective said portion into the respective said base; and tightening at least one of said bolts to elastically deflect the corresponding said portion against one side of a corresponding knife to clamp the knife.

14. The method of claim 13, further comprising providing slots corresponding to said assemblies through at least one of said end plates, and removing a selected knife from the ring assembly by passing said selected knife through one of the corresponding slots.

15. The method of claim 14, wherein said step of passing includes pushing said selected knife through said one of the corresponding slots with another knife.

16. The method of claim 14, comprising providing that said selected knife has first and second opposed cutting edges, wherein, prior to said step of removing said selected knife from the ring assembly said selected knife presented said first cutting edge, the method further comprising turning said selected knife end-for-end and replacing said selected knife into the ring assembly by passing said selected knife through one of the corresponding slots to reinstall the knife in the apparatus so as to present said second cutting edge.

* * * * *

UNITED STATES PATENT AND TRADEMARK OFFICE

CERTIFICATE OF CORRECTION

PATENT NO. : 6,757,952 B1 
DATED : July 6, 2004
INVENTOR(S) : Bradley R. Stager

It is certified that error appears in the above-identified patent and that said Letters Patent is hereby corrected as shown below:

The title page should be deleted and substitute therefor the attached title page.

Delete Drawing Sheets 1-12, and substitute therefore the Drawing Sheets consisting of Figs. 1-12, as shown on the attached pages.

<u>Column 6,</u>
Line 33, delete "bases" and replace with -- bases of said assemblies, --;
Line 34, delete "bases of said assemblies" and replace with -- bases --;
Line 55, delete "the" and replace with -- a --;
Line 56, delete "the" and replace with -- a --.

<u>Column 7,</u>
Line 48, delete "into" and replace with -- into the --.

<u>Column 8,</u>
Line 26, delete "respective said" and replace with -- respective --;
Line 33, delete "the" and replace with -- a --;
Line 35, delete "the" and replace with -- a --.

Signed and Sealed this

Twentieth Day of September, 2005

JON W. DUDAS
*Director of the United States Patent and Trademark Office*

(12) United States Patent
Stager

(10) Patent No.: US 6,757,952 B1
(45) Date of Patent: Jul. 6, 2004

(54) RING SLICER WITH EASILY REMOVABLE KNIFE AND KNIFE ASSEMBLY

(75) Inventor: Bradley R. Stager, Beaverton, OR (US)

(73) Assignee: Key Knife, Inc., Tualatin, OR (US)

( * ) Notice: Subject to any disclaimer, the term of this patent is extended or adjusted under 35 U.S.C. 154(b) by 0 days.

(21) Appl. No.: 10/280,278

(22) Filed: Oct. 25, 2002

(51) Int. Cl.$^7$ .......................... B23P 6/00; B23P 19/04; B27C 1/00

(52) U.S. Cl. .......................... 29/402.03; 29/402.04; 29/402.09; 29/426.1; 29/426.5; 144/174; 241/93; 241/294

(58) Field of Search .......................... 29/402.03, 402.04, 29/402.05, 402.09, 426.1, 426.5, 426.6; 144/172, 174, 162.1, 163, 241, 176, 209.1; 241/85, 86, 92, 93, 95, 294

(56) References Cited

U.S. PATENT DOCUMENTS 3,865,164 A * 2/1975 Sybertz .......................... 144/230
3,989,077 A * 11/1976 Humbert .......................... 144/230
4,135,563 A * 1/1979 Maucher .......................... 144/373
4,139,034 A * 2/1979 Chapman .......................... 144/172
4,194,545 A * 3/1980 Kostermeier .......................... 144/230
4,972,888 A * 11/1990 Dean .......................... 144/172
5,271,440 A * 12/1993 Bradstreet et al. .......................... 144/176
5,271,442 A * 12/1993 Carpenter et al. .......................... 144/220
5,313,696 A * 5/1994 Dunne et al. .......................... 29/426.1
5,348,064 A * 9/1994 Nettles et al. .......................... 144/176
5,444,904 A * 8/1995 Kokko .......................... 29/402.8
5,456,300 A * 10/1995 Rosenkranz et al. .......................... 144/230
5,485,873 A * 1/1996 Crammond .......................... 144/162.1
5,725,464 A * 3/1998 Pallmann .......................... 483/1
5,819,826 A * 10/1998 Schmatjen .......................... 144/241
5,937,923 A 8/1999 Bielagus et al.
5,979,522 A * 11/1999 Swartwood et al. .......................... 144/176
5,996,655 A * 12/1999 Cramond et al. .......................... 144/176
6,554,032 B2 * 4/2003 Pallmann .......................... 144/172
6,561,885 B1 * 5/2003 Loth .......................... 451/122
6,591,878 B2 * 7/2003 Hinchliff .......................... 144/241

* cited by examiner

*Primary Examiner*—Essama Omgba
(74) *Attorney, Agent, or Firm*—Birdwell & Janke, LLP

(57) ABSTRACT

A ring slicer having an easily removable knife and knife assembly. Within the scope of the invention, there is an apparatus for cutting an article of wood, comprising a ring assembly comprising two end plates and a plurality of knife assemblies. Each knife assembly comprises a knife, a base, and a clamp for clamping the knife to the base. The assemblies are provided for installation between the end plates. According to one aspect of the invention, the bases include one or more first apertures and at least one of the end plates includes a corresponding set of one or more second apertures therethrough for receiving respective dowel pins. The first apertures are adapted to snugly slidingly receive the respective dowel pins. According to another aspect of the invention, for each knife assembly, the clamp includes an upper clamping member that is mounted to the base so that a portion of the upper clamping member is cantilevered from the base.

16 Claims, 12 Drawing Sheets

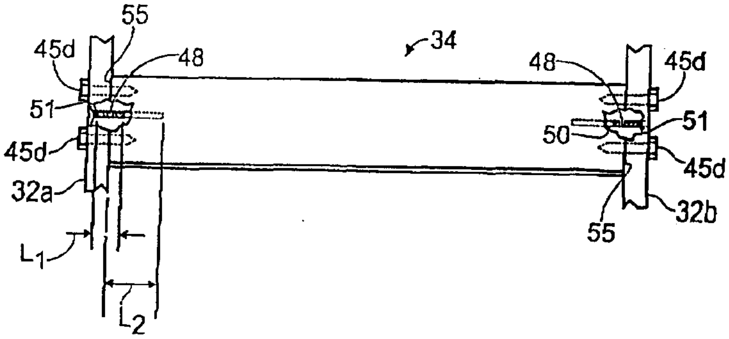

Fig. 1
(PRIOR ART)
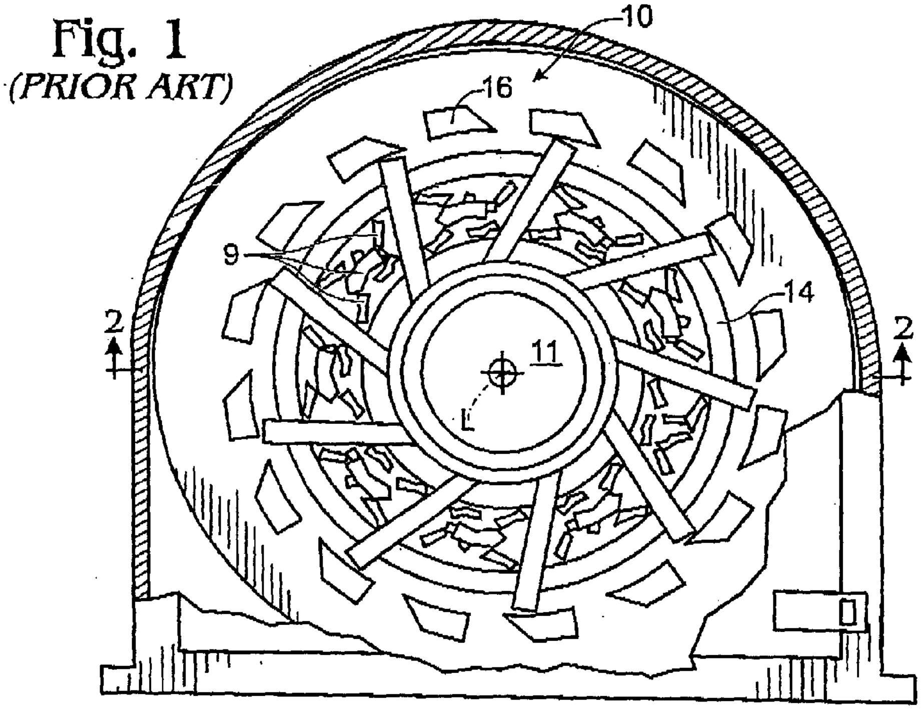
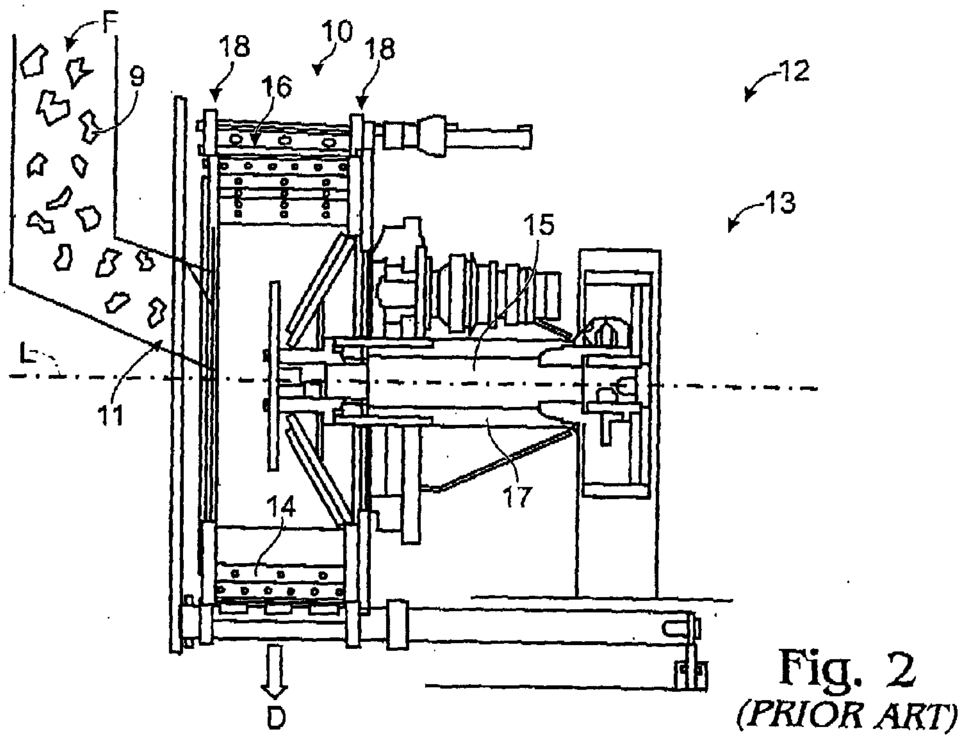
Fig. 2
(PRIOR ART)